US012609913B2

(12) United States Patent
Budvytis et al.

(10) Patent No.: US 12,609,913 B2
(45) Date of Patent: Apr. 21, 2026

(54) CLUSTERING OF VIRTUAL PRIVATE NETWORK SERVERS

(71) Applicant: Netflow, UAB, Vilnius (LT)

(72) Inventors: Donatas Budvytis, Vilnius (LT);
Karolis Kaciulis, Kaisiadorys (LT)

(73) Assignee: Netflow, UAB, Vilnius (LT)

( * ) Notice: Subject to any disclaimer, the term of this patent is extended or adjusted under 35 U.S.C. 154(b) by 0 days.

(21) Appl. No.: 18/504,688

(22) Filed: Nov. 8, 2023

(65) Prior Publication Data

US 2024/0080302 A1 Mar. 7, 2024

Related U.S. Application Data

(60) Continuation of application No. 17/403,801, filed on Aug. 16, 2021, now Pat. No. 11,843,581, which is a division of application No. 17/402,541, filed on Aug. 15, 2021, now abandoned.

(51) Int. Cl.
*G06F 7/04* (2006.01)
*H04L 9/40* (2022.01)
(52) U.S. Cl.
CPC ...... *H04L 63/0272* (2013.01); *H04L 63/0435* (2013.01); *H04L 63/0876* (2013.01); *H04L 63/20* (2013.01)
(58) Field of Classification Search
CPC . G06F 21/44; G06F 21/62; H04L 9/08; H04L 9/0816; H04L 9/0819; H04L 9/0872; H04L 63/029; H04L 63/0435; H04L 63/0876
See application file for complete search history.

(56) References Cited

U.S. PATENT DOCUMENTS

| | | | |
|---|---|---|---|
| 6,032,118 A | 2/2000 | Tello et al. | |
| 6,662,221 B1 | 12/2003 | Gonda et al. | |
| 6,772,226 B1 * | 8/2004 | Bommareddy | ......... H04L 69/40 709/250 |
| 7,376,743 B1 | 5/2008 | Bazzinotti et al. | |
| 8,104,081 B2 | 1/2012 | Khanna et al. | |
| 8,239,934 B2 | 8/2012 | Brown et al. | |
| 9,438,564 B1 | 9/2016 | Weng et al. | |
| 10,764,313 B1 * | 9/2020 | Mushtaq | ................ G06N 20/00 |

(Continued)

OTHER PUBLICATIONS

Chandra et al, VPN for Remote Digital Evidence Acquisition, Nov. 2, 2007, IEEE, pp. 1-4. (Year: 2007).*

(Continued)

*Primary Examiner* — Philip J Chea
*Assistant Examiner* — Jenise E Jackson
(74) *Attorney, Agent, or Firm* — Young Basile Hanlon & MacFarlane, P.C.

(57) ABSTRACT

A VPN connection request is received from a user device. Two or more VPN servers are associated with a single entry Internet Protocol (IP) address. The two or more VPN servers includes a first VPN server and a second VPN server. The single entry IP address is transmitted to the user device. A secure VPN connection is established between the user device and the first VPN server using the single entry IP address. The secure VPN connection is switched to the second VPN server when the first VPN server becomes unavailable such that the secure VPN connection remains intact and the user device continues to communicate via the single entry IP address.

17 Claims, 7 Drawing Sheets

400

Configuring a plurality of VPN servers to be included in a clustered network of VPN servers, the clustered network being associated with a single entry IP address Transmitting the single entry IP address to a user device to enable establishment of a secure VPN connection between the clustered network and that user device such that the plurality of VPN servers securely communicates VPN data with the user device during the established VPN connection

(56) References Cited

U.S. PATENT DOCUMENTS

| | | | | |
|---|---|---|---|---|
| 11,005,929 | B1 * | 5/2021 | Chamarajanagar | ... H04L 47/125 |
| 11,190,491 | B1 | 11/2021 | Kaciulis et al. | |
| 11,245,670 | B1 * | 2/2022 | Celiesius | ........... H04L 63/0272 |
| 11,271,858 | B1 | 3/2022 | Pabijanskas et al. | |
| 11,297,038 | B1 | 4/2022 | Kolaitis et al. | |
| 11,336,717 | B1 | 5/2022 | Celiesius | |
| 11,363,001 | B1 | 6/2022 | Kolaitis et al. | |
| 2003/0093691 | A1 | 5/2003 | Simon et al. | |
| 2005/0180319 | A1 | 8/2005 | Hutnik et al. | |
| 2006/0070115 | A1 | 3/2006 | Yamada et al. | |
| 2007/0113275 | A1 * | 5/2007 | Khanna | ............... H04L 67/1038 |
| | | | | 713/151 |
| 2007/0299954 | A1 | 12/2007 | Fatula | |
| 2008/0263209 | A1 * | 10/2008 | Pisharody | ........... H04L 67/1034 |
| | | | | 709/227 |
| 2009/0046729 | A1 | 2/2009 | Nagata | |
| 2009/0144817 | A1 * | 6/2009 | Kumar | ................ H04L 63/0272 |
| | | | | 726/15 |
| 2009/0292824 | A1 | 11/2009 | Marashi et al. | |
| 2011/0107414 | A1 | 5/2011 | Diab et al. | |
| 2012/0096269 | A1 * | 4/2012 | McAlister | ............. H04L 63/061 |
| | | | | 713/171 |
| 2014/0136597 | A1 | 5/2014 | Bland et al. | |
| 2014/0301249 | A1 | 10/2014 | Moss et al. | |
| 2015/0188889 | A1 | 7/2015 | Lawson | |
| 2016/0286001 | A1 * | 9/2016 | Chan | ....................... H04L 67/63 |
| 2018/0041613 | A1 | 2/2018 | Lapidous et al. | |
| 2018/0091417 | A1 | 3/2018 | Ore et al. | |
| 2018/0191838 | A1 * | 7/2018 | Friedman | ............ H04L 41/0895 |
| 2019/0297897 | A1 | 10/2019 | Mitter et al. | |
| 2019/0327312 | A1 | 10/2019 | Gupta et al. | |
| 2020/0314212 | A1 | 10/2020 | Branch et al. | |
| 2021/0281529 | A1 | 9/2021 | Baron et al. | |
| 2021/0297897 | A1 | 9/2021 | Cunningham et al. | |
| 2022/0255900 | A1 * | 8/2022 | Gupta | ..................... H04L 67/61 |

OTHER PUBLICATIONS

Xu et al, Research on Network Security of VPN Technology, Dec. 6, 2020, IEEE, pp. 539-542. (Year: 2020).*

Qian et al, Balancing Request Denial Probability and Latency in an Agent-Based VPN Architecture, IEEE, Dec. 17, 2010, pp. 282-295. (Year:2010).

Wolinsky et al, On the Design of Scalable Self-Configuring Virtual Networks, IEEE, Nov. 20, 2009, pp. 1-12. (Year: 2009).

* cited by examiner

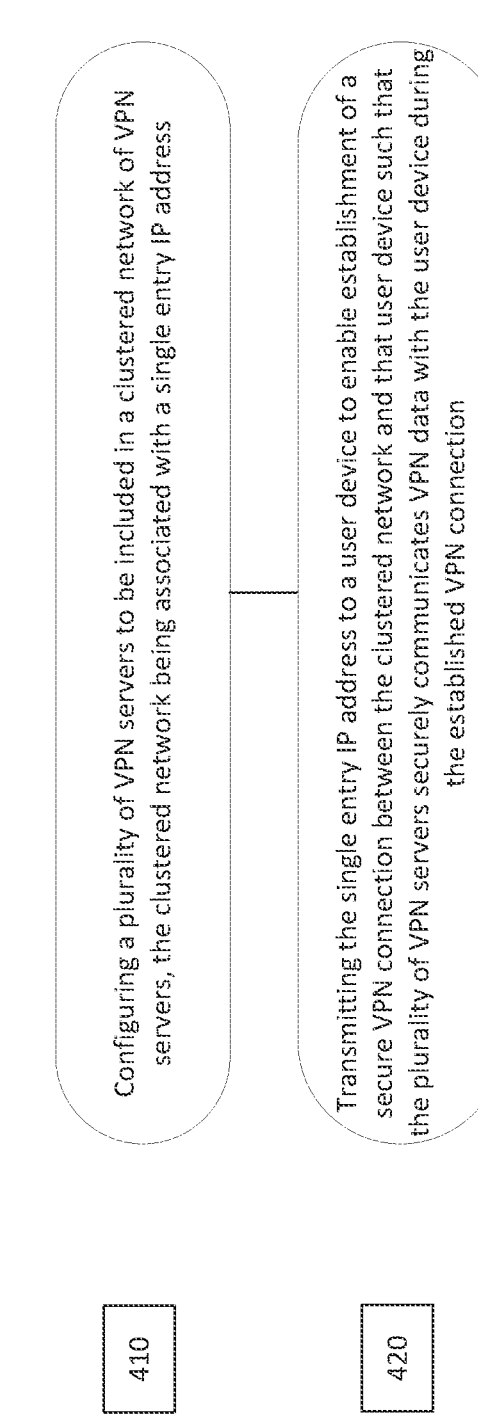

400

410 Configuring a plurality of VPN servers to be included in a clustered network of VPN servers, the clustered network being associated with a single entry IP address 420 Transmitting the single entry IP address to a user device to enable establishment of a secure VPN connection between the clustered network and that user device such that the plurality of VPN servers securely communicates VPN data with the user device during the established VPN connection

510   Receiving, from a VPN service provider (VSP) control infrastructure, VPN data associated with a user device having an established VPN connection with the clustered network 520   Communicating, utilizing key information, the VPN data with the user device during the established VPN connection

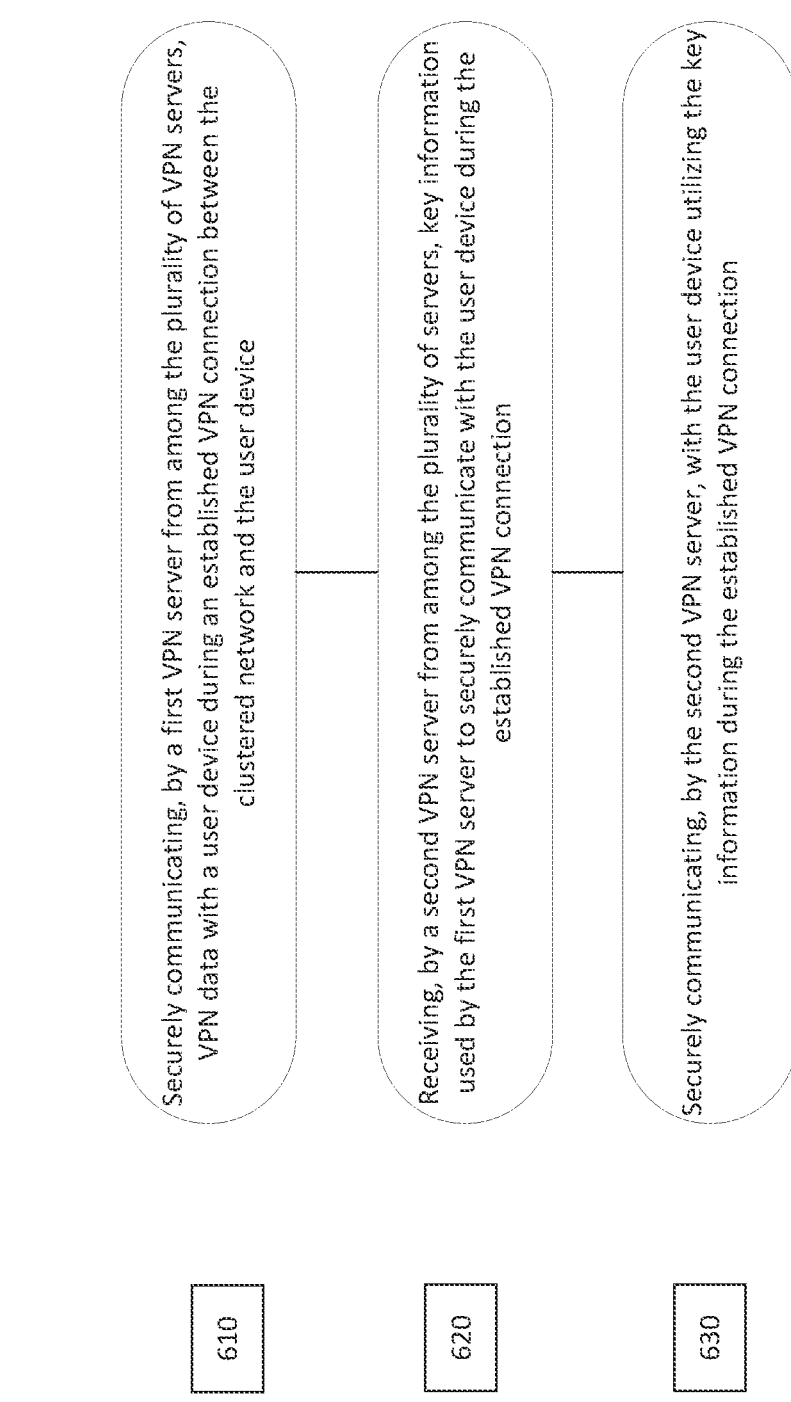

600

610 Securely communicating, by a first VPN server from among the plurality of VPN servers, VPN data with a user device during an established VPN connection between the clustered network and the user device 620 Receiving, by a second VPN server from among the plurality of servers, key information used by the first VPN server to securely communicate with the user device during the established VPN connection 630 Securely communicating, by the second VPN server, with the user device utilizing the key information during the established VPN connection

FIG. 6

CLUSTERING OF VIRTUAL PRIVATE NETWORK SERVERS

CROSS-REFERENCE

This application is a continuation of U.S. Non-Provisional patent application Ser. No. 17/403,801, filed Aug. 16, 2021, which is a divisional of U.S. Non-Provisional patent application Ser. No. 17/402,541 filed on Aug. 15, 2021, and titled "Clustering of Virtual Private Network Servers," the entire contents of which are incorporated herein by reference.

FIELD OF DISCLOSURE

Aspects of the present disclosure generally relate to a virtual private network (VPN), and more particularly to clustering of VPN servers.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with help of an encryption algorithm. Decryption may be associated with changing the data from being in the encoded, unreadable format to being in the transparently readable format with help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger is the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, a method includes receiving a VPN connection request from a user device; associating two or more VPN servers with a single entry Internet Protocol (IP) address, where the two or more VPN servers includes a first VPN server and a second VPN server; transmitting the single entry IP address to the user device; establishing a secure VPN connection between the user device and the first VPN server using the single entry IP address; and switching the secure VPN connection to the second VPN server when the first VPN server becomes unavailable, where the secure VPN connection remains intact and the user device continues to communicate via the single entry IP address.

In a second aspect, a server includes one or more processors configured to execute instructions to receive a VPN connection request from a user device; associate a first VPN server and a second VPN server with a single entry Internet Protocol (IP) address; transmit the single entry IP address to the user device; establish a secure VPN connection between the user device and the first VPN server using the single entry IP address; and switch the secure VPN connection to the second VPN server when the first VPN server becomes unavailable, where the secure VPN connection remains intact and the user device continues to communicate via the single entry IP address.

In a third aspect, non-transitory computer readable media store instructions that are operable to cause one or more processors to perform operations that include receiving a VPN connection request from a user device; associating a first VPN server and a second VPN server with a single entry Internet Protocol (IP) address; transmitting the single entry IP address to the user device; establishing a secure VPN connection between the user device and the first VPN server using the single entry IP address; and switching the secure VPN connection to the second VPN server when the first VPN server becomes unavailable, where the secure VPN connection remains intact and the user device continues to communicate via the single entry IP address It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
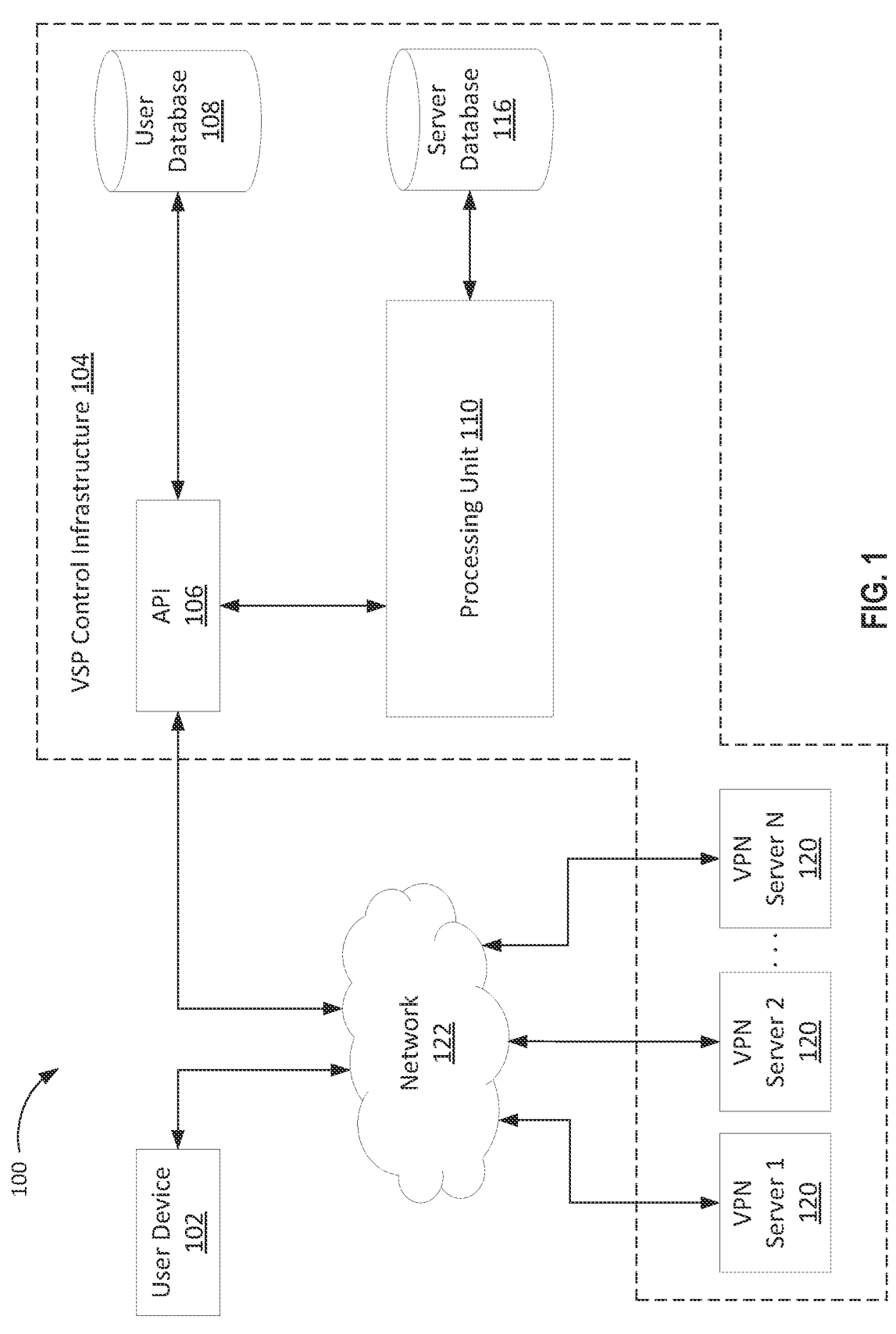

FIG. 1 is an illustration of an example system associated with clustering of VPN servers, according to various aspects of the present disclosure.

Figure 2:
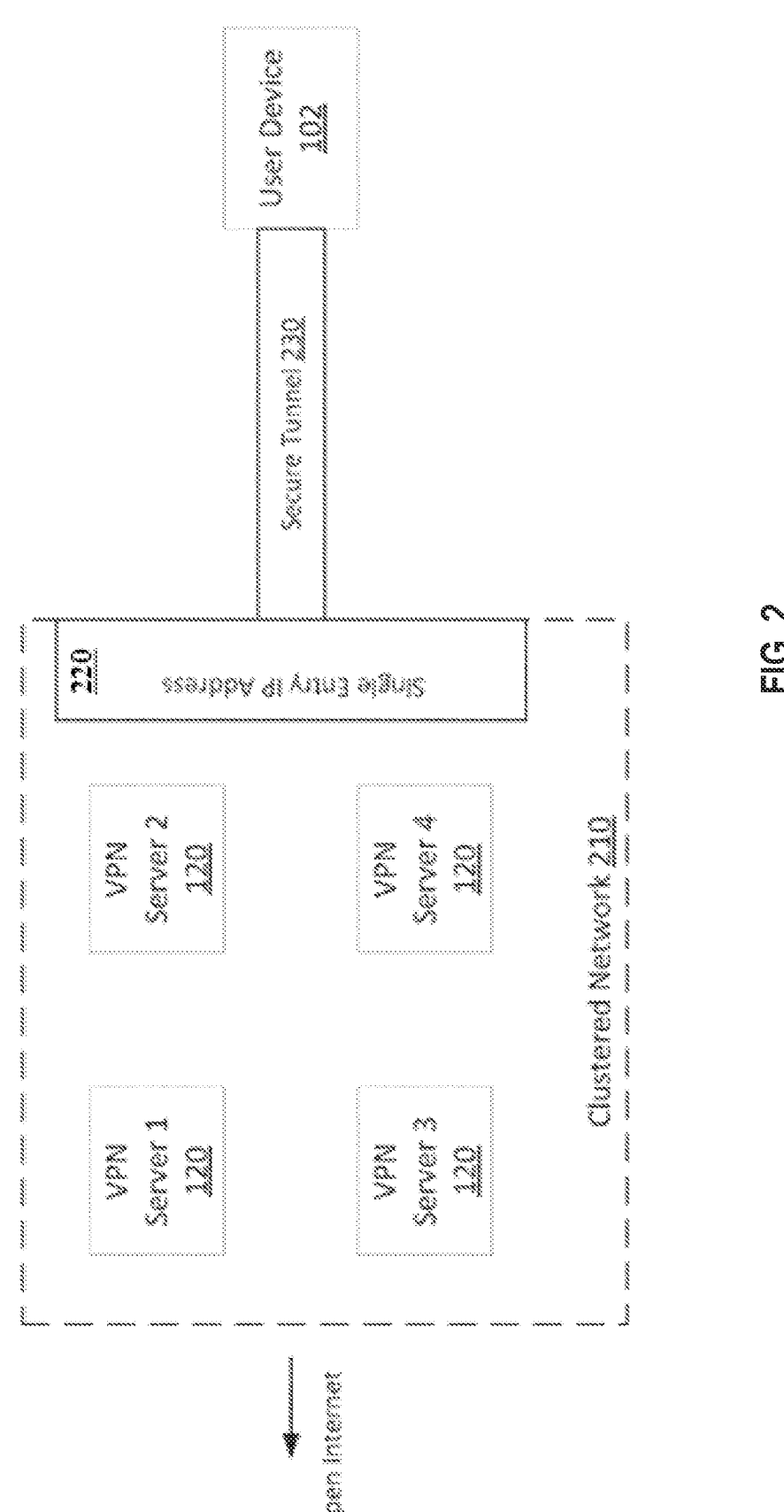

FIG. 2 is an illustration of an example system associated with clustering of VPN servers, according to various aspects of the present disclosure.

Figure 3:
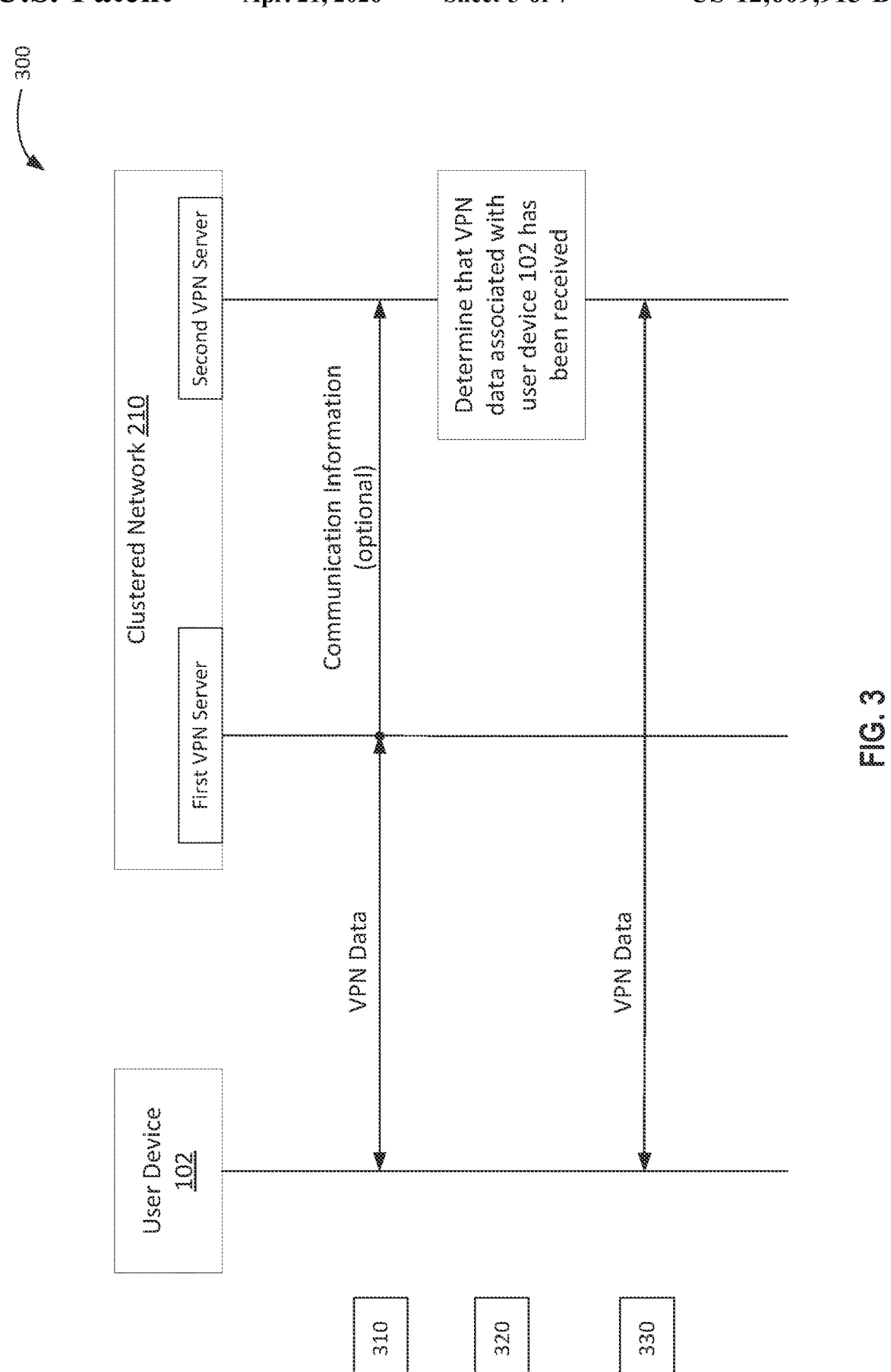

FIG. 3 is an illustration of an example flow associated with clustering of VPN servers, according to various aspects of the present disclosure.

FIG. 4 is an illustration of an example process associated with clustering of VPN servers, according to various aspects of the present disclosure.

Figure 5:
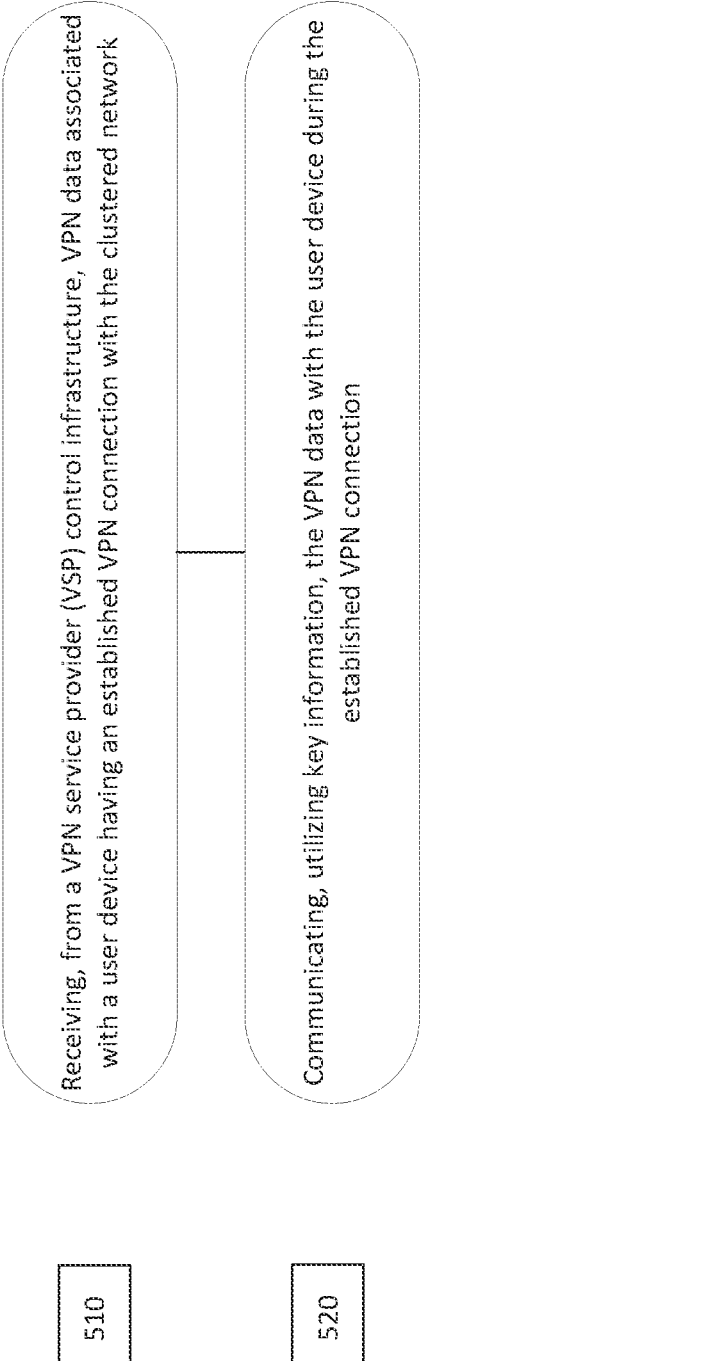

FIG. 5 is an illustration of an example process associated with clustering of VPN servers, according to various aspects of the present disclosure.

FIG. 6 is an illustration of an example process associated with clustering of VPN servers, according to various aspects of the present disclosure.

Figure 7:
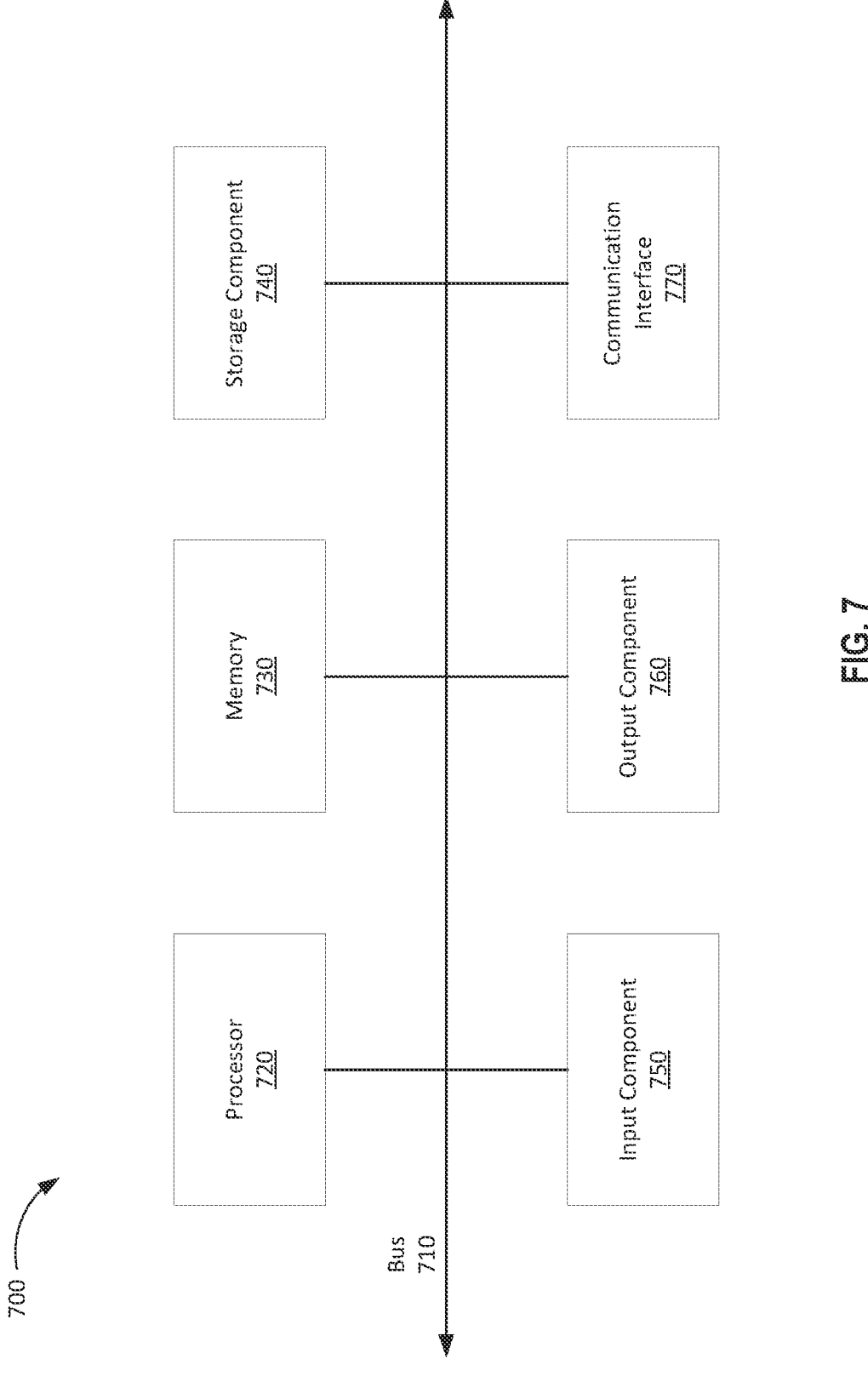

FIG. 7 is an illustration of example devices associated with clustering of VPN servers, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with clustering of VPN servers, according to various aspects of the present disclosure. Example 100 shows an architectural depiction of components included in system 100. In some aspects, the components may include a user device 102 capable of communicating with one or more VPN servers 120 and with a VPN service provider (VSP) control infrastructure 104 over a network 122. The VSP control infrastructure 104 may be controlled by a VPN service provider and may include an application programming interface (API) 106, a user database 108, processing unit 110, a server database 116, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 122. The processing unit 110 may be capable of controlling operation of the one or more VPN servers 120.

The user device 102 may be a physical computing device capable of hosting a VPN application and of connecting to the network 122. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 122 may be any digital telecommunication network that permits several nodes to share and access resources. In some aspects, the network 122 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 122, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120. The user device 102 may establish a VPN connection (e.g., an encrypted tunnel) with the optimal VPN server. In some aspects, the optimal VPN server with which the user device establishes the encrypted tunnel may be referred to as a primary VPN server or an entry VPN server. In some aspects, a VPN server 120 may be a piece of physical or virtual computer hardware and/or software capable of securely communicating with (the VPN application on) the user device 102 for provision of VPN services.

The processing unit 110 may be a logical unit including a scoring engine 112. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120.

In some aspects, based at least in part on server penalty scores calculated via the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

One or more components (e.g., API 106, user database 108, processing unit 110, and/or server database 116) included in the VSP control infrastructure 104 may further be associated with a controller/processor, a memory, or a combination thereof. For instance, the one or more components of the set of components may include or may be included in a controller/processor, a memory, or a combination thereof. In some aspects, the one or more of the components included in the VSP control infrastructure 104 may be separate and distinct from each other. Alternatively, in some aspects, one or more of the components included in the VSP control infrastructure 104 may be combined with one or more of other components included in the VSP control infrastructure 104. In some aspects, the one or more of the components included in the VSP control infrastructure 104 may be local with respect to each other. Alternatively, in some aspects, one or more of the components included in the VSP control infrastructure 104 may be located remotely with respect to one or more of other components included in the VSP control infrastructure 104. Additionally, or alternatively, one or more components of the components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

A user device may request VPN services from a VSP control infrastructure. For instance, the user device may transmit a connection request and/or an authentication request to an API included in the VSP control infrastructure. Thereafter, the user device may undergo an authentication process involving the API and a database included in the VSP control infrastructure. Once authenticated, the user device may transmit to the VSP control infrastructure a request for an IP address of an optimal VPN server. A processing unit included in the VSP control infrastructure may determine/identify a single VPN server associated with the VSP control infrastructure for providing the VPN services to the user device. The VSP control infrastructure may provide an entry IP address associated with this single VPN server to the user device. The user device may utilize the entry IP address to initiate and establish a secure tunnel to begin a VPN connection with the single VPN server and receive the VPN services.

While receiving the VPN services, the user device may experience an interruption due to, for example, the VPN server becoming unavailable during the established VPN connection. The VPN server may become unavailable for various reasons such as, for example, the VPN server becoming overloaded with user devices, the VPN server losing connection to the Internet, the VPN server being blocked during the established VPN connection, the VPN server running out of memory resources during the established VPN connection, the VPN server running out of processing resources during the established VPN connection, or the like.

In this case, the secure tunnel may collapse from an interface associated with the single VPN server, thereby exposing the secure tunnel from an interface associated with the user device. As a result, private information of the user device (e.g., a location of the user device, a list of websites visited by the user device, a nature of data requested by the user device, or the like) may leak from the interface associated with the user device and be compromised.

Additionally, the user device may have to re-establish a new secure tunnel to begin a new VPN connection with another available VPN server. In this case, the user device and the VSP control infrastructure may have to again perform several activities. For instance, the user device may have to again transmit the connection and/or the authentication request and again undergo the authentication process. The VSP control infrastructure may have to again process the received requests, again perform the authentication process, again determine/identify the available single VPN server for providing the VPN services, and again provide a new entry IP address associated with the available single VPN server to the user device. The user device may have to again utilize the new entry IP address to initiate and establish the new secure tunnel to begin the new VPN connection with the available single VPN server.

Performing the several activities again may consume VSP control infrastructure resources (e.g., network bandwidth, management resources, processing resources, memory resources, or the like) and user device resources (e.g., processing resources, memory resources, power consumption resources, battery life, or the like) that may otherwise be used to perform suitable tasks associated with the VPN.

Various aspects of systems and techniques discussed in the present disclosure enable clustering of VPN servers in a VPN. In some aspects, clustering (e.g., grouping) of VPN servers may include a VSP control infrastructure (e.g., processing unit 110) configuring a plurality of VPN servers to be part of a clustered (e.g., grouped) network to communicate information associated with the clustered network. In some aspects, the VSP control infrastructure may be responsible for operation of the clustered network and may communicate (e.g., transmit and/or receive) information associated with the clustered network with each VPN server in the clustered network. Further, the clustering may include the VSP control infrastructure associating the clustered network with a single entry IP address. In some aspects, the VSP control infrastructure may configure each of the plurality of VPN servers to be associated with the single entry IP address. In some aspects, the VSP control infrastructure may transmit the single entry IP address to a user device to enable the user device to establish a secure (e.g., encrypted/encapsulated) tunnel with the clustered network.

In this way, during an established VPN connection, the user device may securely receive VPN services from the plurality of VPN servers included in the clustered network. In one example, when a first VPN server, from among the plurality of VPN servers, that is providing VPN services to the user device becomes unavailable during the established VPN connection, a second VPN server, from among the plurality of VPN servers, may replace the first VPN server and continue providing the VPN services to the user device during the established VPN connection. As a result, the secure tunnel may remain intact and private information associated with the user device may be prevented from becoming compromised. Additionally, the user device may continue to receive the VPN services without interruption during the established VPN connection. Also, the VSP control infrastructure resources (network bandwidth, management resources, processing resources, memory resources, or the like) and user device resources (processing resources, memory resources, power consumption resources, battery life, or the like) may be utilized to perform suitable tasks associated with the VPN.

In some aspects, a processing unit (e.g., processing unit 110) included in the VSP control infrastructure may configure a plurality of VPN servers to be included in a clustered network of VPN servers, the clustered network being associated with a single entry IP address, and may transmit the single entry IP address to a user device to enable the user device to establish a secure VPN connection with the clustered network such that the plurality of VPN servers may securely communicate VPN data with the plurality of VPN servers.

FIG. 2 is an illustration of an example system 200 associated with clustering of VPN servers, according to various aspects of the present disclosure. The example system 200 may include a clustered network 210 including a plurality of VPN servers 120 such as, for example, VPN server 1, VPN server 2, VPN server 3, and VPN server 4. Although four VPN servers 120 are shown in FIG. 2, the present disclosure contemplates the clustered network 210 to include any number of VPN servers. Further, one or more VPN servers 120 may be added to the clustered network 210 and/or one or more VPN servers included in the clustered network 210 may be removed in an ad hoc manner by a VSP control infrastructure.

The clustered network 210 may be associated with a single entry IP address 220, which may be used by a user device 102 to establish a secure tunnel 230 with the clustered network 210. The secure tunnel 230 may represent an established VPN connection between the clustered network 210 and the user device 102. In some aspects, the present disclosure contemplates the secure tunnel 230 being established using a VPN protocol such as, for example, proxy protocol v2, IP in IP (Protocol 4); IP in IPv4/IPv6; SIT/IPv6 (Protocol 41); IPv6 in IPv4/IPv6; GRE (Protocol 47); Generic Routing Encapsulation; OpenVPN (UDP port 1194); SSTP (TCP port 443); Secure Socket Tunneling Protocol; IPSec (Protocol 50 and 51); Internet Protocol Security; L2TP (Protocol 115); Layer 2 Tunneling Protocol; VXLAN (UDP port 4789); Virtual Extensible Local Area Network; WireGuard; Quic, and other available data communication protocols and their future iterations.

A processing unit (e.g., processing unit 110) included in the VSP control infrastructure (e.g., VSP control infrastructure 104) may configure the plurality of VPN servers to be included in and function as part of the clustered network 210 and to provide VPN services to the user device 102 as a clustered network. In some aspects, providing VPN services may include securely communicating (e.g., transmitting and/or receiving) VPN data with the user device 102. In some aspects, VPN data may include, for example, a data request received from the user device 102 and/or data of interest obtained by the VPN server based at least in part on receiving the data request.

The processing unit may configure the plurality of VPN servers by associating each of the plurality of VPN servers with the single entry IP address 220. Based at least in part on such an association of the plurality of VPN servers with a single entry IP address 220, each of the plurality of VPN servers may be enabled to provide VPN services to the user device 102 as part of the clustered network 210. For instance, upon successful authentication, the processing unit may transmit the single entry IP address 220 to the user device 102, which may use the single entry IP address 220 to initiate and establish the secure tunnel 230 (e.g., establish a VPN connection) with the clustered network 210 (e.g., with a given VPN server included in the clustered network).

Based at least in part on establishing the VPN connection, the user device 102 may receive VPN services from the plurality of VPN servers during the established VPN connection. In some aspects, the user device may receive VPN services from a given VPN server, from among the plurality of VPN servers, at a given time. For instance, based at least part on establishing the VPN connection, the user device 102 may begin receiving VPN services from, for example, VPN server 2.

The VSP control infrastructure may also configure the plurality of VPN servers to be communicatively coupled with each other and/or with the VSP control infrastructure (e.g., processing unit 110) for communicating data associated with the clustered network 210. In an example, each of the plurality of VPN servers included in the clustered network 210 may be configured to communicate (e.g., transmit and/or receive) communication information with each of the other of the plurality of VPN servers included in the clustered network 210 and/or with the VSP control infrastructure. The plurality of VPN servers may communicate with the communication information using, for example, a hypertext transfer protocol (HTTP), a hypertext transfer protocol secure (HTTPS), a quick user datagram protocol (UDP) Internet Connection (QUIC) protocol, a simple network management protocol (SNMP), or another suitable protocol.

In some aspects, the communication information may include information associated with an availability of a VPN server to provide VPN services as part of the clustered network 210. The communication information may include an availability notification indicating that a VPN server transmitting the availability notification is available to provide VPN services as part of the clustered network 210. In some aspects, transmitting the availability notification may include transmitting the single entry IP address associated with the clustered network, thereby indicating availability of the transmitting VPN server to provide VPN services as part of the clustered network. In some aspects, each of the plurality of VPN servers may be configured to transmit the availability notification at respective preconfigured periodic intervals (e.g., every five seconds, pen seconds, 20 seconds, 40 seconds, 60 seconds, 120 seconds, 240 seconds, 480 seconds, or the like). In some aspects, the preconfigured periodic intervals may be of a same duration for all VPN servers included in the clustered network 210. In some aspects, a first preconfigured periodic interval for a first VPN server may be of a different duration with respect to a duration of a second preconfigured periodic interval for a second VPN server.

In an example, the clustered network may have an established VPN connection with the user device 102 via VPN server 2, which may be providing VPN services to the user device 102. Based at least in part on receiving an availability notification from VPN server 2 within a respective preconfigured periodic interval, the VSP control infrastructure may determine that VPN server 2 is and/or remains available to provide VPN services as part of the clustered network 210. When the VSP control infrastructure fails to receive the availability notification from VPN server 2 within the respective preconfigured periodic interval, the VSP control infrastructure determines a failure to receive the availability notification from VPN server 2. In this case, the VSP control infrastructure may determine that VPN server 2 is no longer available to provide VPN services as part of the clustered network 210. In other words, the VSP control infrastructure may determine that VPN server 2 has become unavailable to provide VPN services as part of the clustered network 210.

Configuring the VPN servers to be part of the clustered network may include the VSP control infrastructure configuring each of the other of the plurality of configured VPN servers to continue to securely communicate VPN data with the user device 102 during the established VPN connection between the clustered network and the user device 102. For instance, when the VSP control infrastructure determines that VPN server 2 has become unavailable, the VSP control infrastructure may enable another configured VPN server (e.g., VPN server 3) to continue to provide the VPN services to the user device 102 during the established VPN connection. In some aspects, the VSP control infrastructure may enable VPN server 3 to continue to provide VPN services to the user device 102 by routing data traffic associated with the established VPN connection (e.g., the VPN data associated with the user device 102) to VPN server 3. The VSP control infrastructure may use appropriate routing protocols to route the established VPN connection and/or the VPN data associated with the user device 102 to VPN server 3.

In some aspects, the VSP control infrastructure may route the established VPN connection and/or the VPN data associated with the user device 102 to VPN server 3 and enable VPN server 3 to continue to provide VPN services to the user device 102 because VPN server 3 may be a next optimal server, after VPN server 2, to provide VPN services to the user device 102 during the established VPN connection. In some aspects, VPN server 3 may be the next optimal server because VPN server 3 may be located geographically/physically closer (and therefore able to provide speedier service) to the user device 102 as compared to the other VPN servers (e.g., VPN server 1 and VPN server 4) that are available to provide VPN services as part of the clustered network 210. In some aspects, VPN server 3 may be the next optimal server because VPN server 3 may have a highest available bandwidth to provide VPN services to the user device 102 as compared to the other VPN servers (e.g., VPN server 1 and VPN server 4) that are available to provide VPN services as part of the clustered network 210. In some aspects, the VPN server 3 may be the next optimal server because VPN server 3 may be located geographically/physically closer to an international Internet exchange hub (and therefore able to provide speedier service) as compared to the other VPN servers (e.g., VPN server 1 and VPN server 4) that are available to provide VPN services as part of the clustered network 210.

In some aspects, the communication information may include tunnel information (described in more detail below) associated with securely providing VPN services to a user device. As discussed above, when the VSP control infrastructure determines that VPN server 2, which is providing VPN services to the user device 102 has become unavailable, the VSP control infrastructure may enable VPN server 3, included in the clustered network, to continue to provide the VPN services to the user device 102 by routing the VPN data associated with the user device 102 to VPN server 3. Additionally, the VSP control infrastructure may provide VPN server 3 with the tunnel information used by VPN server 2 to securely communicate with the user device 102, thereby enabling VPN server 3 to continue to securely communicate the VPN data with the user device 102 during the established VPN connection between the clustered network 210 and the user device 102.

In some aspects, the VSP control infrastructure may configure the plurality of VPN servers to be communicatively coupled with each other for communicating tunnel information. The tunnel information may be associated with an established VPN connection with a user device. For instance, a VPN server having an established VPN connection with a user device may transmit, to each of the other of the plurality of VPN servers, tunnel information indicating, for example, key information used by the VPN server to communicate VPN data with the user device. In an example, VPN server 2 having an established VPN connection with the user device 102 may transmit, to VPN server 1, VPN server 3, and/or VPN server 4, tunnel information indicating, for example, key information used by VPN server 2 to securely communicate the VPN data with the user device 102. In some aspects, the key information may include information associated with encrypting and decrypting data during the established VPN connection. For instance, the key information may include information associated with a decryption key used to decrypt encrypted information to be received from the user device 102 and/or information associated with an encryption key used to encrypt information to be transmitted to the user device 102. In some aspects, VPN server 2 may be configured to transmit the tunnel information at a beginning of providing VPN services (e.g., when VPN server 2 establishes the VPN connection and/or starts providing VPN services) to the user device 102.

As such, when the VSP control infrastructure determines that VPN server 2 has become unavailable, VPN server 3 may be configured to continue to provide VPN services to the user device 102 during the established VPN connection. For instance, VPN server 3 may be configured to use the tunnel information received from VPN server 2 to continue to securely communicate VPN data with the user device 102. In some aspects, VPN server 3 may use the information associated with the decryption key to determine the decryption key and may use the information associated with the encryption key to determine the encryption key. Further, VPN server 3 may use the decryption key to decrypt encrypted data to be received from the user device 102 and may use the encryption key to encrypt data to be transmitted to the user device 102.

In some aspects, the VSP control infrastructure may configure VPN server 3 (and/or all other VPN servers included in the clustered network) to continue to securely communicate with the user device 102 without receiving the tunnel information used by VPN server 2. For instance, when the VSP control infrastructure determines that VPN server 2, which is providing VPN services to the user device 102 has become unavailable, the VSP control infrastructure may enable VPN server 3, included in the clustered network, to continue to provide the VPN services to the user device 102 by routing the VPN data associated with the user device 102 to VPN server 3. Based at least in part on receiving the VPN data associated with the user device 102, VPN server 3 may configure the established VPN connection to use new tunnel information. For instance, VPN server 3 and the user device 102 may agree to use new key information (e.g., second key information) associated with encrypting and decrypting data during the established VPN connection. The new key information may include information associated with a new decryption key used to decrypt encrypted information to be received from the user device 102 and/or information associated with a new encryption key used to encrypt information to be transmitted to the user device 102.

In this way, based at least in part on utilizing the various techniques and aspects discussed herein, a plurality of VPN servers included in a clustered network may provide VPN services to a user device during an established VPN connection. As a result, when a VPN server providing VPN services to the user device becomes unavailable, (i) a secure tunnel between the user device and the clustered network may remain intact and private information associated with the user device may be prevented from becoming compromised and (ii) the user device may continue to receive the VPN services without interruption. Additionally, VSP control infrastructure resources (network bandwidth, management resources, processing resources, memory resources, or the like) and user device resources (processing resources, memory resources, power consumption resources, battery life, or the like) may be utilized to perform suitable tasks associated with the VPN.

As indicated above, FIG. 2 is provided as an example. Other examples may differ from what is described with regard to FIG. 2.

FIG. 3 is an illustration of an example flow 300 associated with clustering of VPN servers, according to various aspects of the present disclosure. The example flow 300 may include a user device 102 in communication with a clustered network 210. In some aspects, as discussed elsewhere herein, a VSP control infrastructure associated with the clustered network 210 may transmit a single entry IP address associated with the clustered network 210 to the user device 102. The user device 102 may utilize the single entry IP address to initiate and establish a secure tunnel (e.g., secure VPN connection) with the clustered network 210. Also, as discussed elsewhere herein, the clustered network 210 may include a plurality of VPN servers (e.g., VPN servers 120) associated with the single entry IP address. As shown in FIG. 3, the plurality of VPN servers may include a first VPN server and a second VPN server. Although two VPN servers are shown in FIG. 3, the present disclosure contemplates the clustered network 210 to include any number of VPN servers.

Based at least in part on the secure VPN connection being established, the first VPN server may start providing VPN services to the user device 102 during the established VPN connection, as shown by reference numeral 310. As discussed elsewhere herein, providing VPN services may include securely communicating VPN data with the user device 102. In some aspects, the first VPN server may be an optimal server for providing the VPN services to the user device 102 because, for example, the first VPN server may be located geographically/physically closest to the user device 102, the first VPN server may have a highest amount of bandwidth to provide the VPN services to the user device 102, and/or the first VPN server may be located geographically/physically closes to an international Internet exchange hub as compared to each of the other of the plurality of VPN servers.

Based at least in part on starting to provide the VPN services to the user device 102, as also shown by reference numeral 310, the first VPN server may communicate (e.g., transmit and/or receive) communication information with each of the other of the plurality of VPN servers included in the clustered network 210 and/or with the VSP control infrastructure. In some aspects, the first VPN server may transmit, and the second VPN server (optional) and/or the VSP control infrastructure may receive, the communication information including an availability notification and tunnel information. As discussed elsewhere herein, the first VPN server may periodically transmit, and the VSP control infrastructure may periodically receive, the availability notification indicating an availability of the first VPN server to provide VPN services as part of the clustered network 210. Further, as discussed elsewhere herein, optionally, the first VPN server may transmit, and each of the other of the plurality of VPN servers (including the second VPN server) may receive, the tunnel information indicating key information utilized to securely communicate the VPN data with the user device 102.

As shown by reference numeral 320, the second VPN server may determine that the first VPN server has become unavailable. In some aspects, the second VPN server may determine that the first VPN server has become unavailable based at least in part on determining that the VSP control infrastructure has routed, to VPN server 3, the established VPN connection between VPN server 2 and the user device 102 and/or the VPN data associated with the user device 102, as discussed elsewhere herein. Based at least in part on determining that the first VPN server has become unavailable, as shown by reference numeral 330, the second VPN server may utilize the received tunnel information to continue to provide the VPN services to the user device 102 during the established VPN connection, as discussed elsewhere herein. In some aspects, the second VPN server may be the next optimal server, after the first VPN server, to provide the VPN services to the user device 102, as discussed elsewhere herein.

In this way, when the first VPN server becomes unavailable, (i) a secure tunnel between the user device 102 and the clustered network 210 may remain intact and private information associated with the user device 102 may be prevented from becoming compromised and (ii) the user device 102 may continue to receive the VPN services without interruption. Additionally, VSP control infrastructure resources (network bandwidth, management resources, processing resources, memory resources, or the like) and user device resources (processing resources, memory resources, power consumption resources, battery life, or the like) may be utilized to perform suitable tasks associated with the VPN.

As indicated above, FIG. 3 is provided as an example. Other examples may differ from what is described with regard to FIG. 3.

FIG. 4 is an illustration of an example process 400 associated with clustering of VPN servers in a VPN, according to various aspects of the present disclosure. In some aspects, the process 400 may be performed by a memory (e.g., memory 530) and a processor (e.g., processor 520, processing unit 110, etc.) associated with a VSP control infrastructure (e.g., VSP control infrastructure 104). As shown by reference numeral 410, process 400 may include configuring a plurality of VPN servers to be included in a clustered network of VPN servers, the clustered network being associated with a single entry IP address. For instance, the VSP control infrastructure may utilize an associated memory and/or a processor to configure a plurality of VPN servers to be included in a clustered network of VPN servers, the clustered network being associated with a single entry IP address, as discussed elsewhere herein.

As shown by reference numeral 420, process 400 may include transmitting the single entry IP address to a user device to enable establishment of a secure VPN connection between the clustered network and the user device such that the plurality of VPN servers securely communicates VPN data with the user device during the established VPN connection. For instance, the VPN server may utilize a communication interface (e.g., communication interface 770 of FIG. 7) and the associated memory and/or processor to transmit the single entry IP address to a user device to enable establishment of a secure VPN connection between the clustered network and the user device such that the plurality of VPN servers securely communicates VPN data with the user device during the established VPN connection, as discussed elsewhere herein.

Process 400 may include additional aspects, such as any single aspect or any combination of aspects described below and/or in connection with one or more other processes described elsewhere herein.

In a first aspect, in process 400, configuring the plurality of servers includes configuring a first VPN server, from among the plurality of VPN servers, to communicate the VPN data with the user device during the established VPN connection, and configuring a second VPN server, from among the plurality of VPN servers, to continue to securely communicate the VPN data with the user device during the established VPN connection when the first VPN server becomes unavailable.

In a second aspect, alone or in combination with the first aspect, in process 400, configuring the plurality of VPN servers includes configuring a first VPN server, from among the plurality of VPN servers, to periodically communicate a notification with a second VPN server from among the plurality of VPN servers, the notification indicating an availability of the first VPN server to securely communicate the VPN data with the user device.

In a third aspect, alone or in combination with the first through second aspects, in process 400, configuring the plurality of VPN servers includes configuring a first VPN server, from among the plurality of VPN servers, to communicate key information with a second VPN server from among the plurality of VPN servers, the key information being used to securely communicate the VPN data with the user device.

In a fourth aspect, alone or in combination with the first through third aspects, in process 400, configuring the plurality of servers includes configuring a first VPN server, from among the plurality of VPN servers, to securely communicate the VPN data with the user device using key information, and configuring a second VPN server, from among the plurality of VPN servers, to continue to securely communicate the VPN data with the user device using the key information when the first VPN server becomes unavailable.

In a fifth aspect, alone or in combination with the first through fourth aspects, in process 400, configuring the plurality of servers includes configuring an optimal VPN server, from among the plurality of VPN servers, to securely communicate the VPN data with the user device during the established VPN connection, and configuring a next optimal VPN server, from among the plurality of VPN servers, to continue to securely communicate the VPN data with the user device during the established VPN connection when the optimal VPN server becomes unavailable.

In a sixth aspect, alone or in combination with the first through fifth aspects, in process 400, wherein configuring the plurality of servers includes configuring each of the plurality of VPN servers to communicate information with each of the other of the plurality of VPN servers using a hypertext transfer protocol (HTTP).

In a seventh aspect, alone or in combination with the first through sixth aspects, in process 400, wherein configuring the plurality of servers includes configuring a first VPN server, from among the plurality of VPN servers, to securely communicate the VPN data with the user device using first key information, and configuring a second VPN server, from among the plurality of VPN servers, to continue to securely communicate the VPN data with the user device using the second key information when the first VPN server becomes unavailable, the second key information being different from the first key information.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with clustering of VPN servers in a VPN, according to various aspects of the present disclosure. In some aspects, the process 500 may be performed by a memory (e.g., memory 530) and a processor (e.g., processor 520) associated with a VPN server (e.g., VPN server 120). As shown by reference numeral 510, process 500 may include receiving, from a VPN service provider (VSP) control infrastructure, VPN data associated with a user device having an established VPN connection with the clustered network. For instance, the VPN server may utilize the associated memory and/or processor to receive, from a VPN service provider (VSP) control infrastructure, VPN data associated with a user device having an established VPN connection with the clustered network, as discussed elsewhere herein.

As shown by reference numeral 520, process 500 may include communicating, utilizing key information, the VPN data with the user device during the established VPN connection. For instance, the VPN server may utilize a communication interface (e.g., communication interface 770 of FIG. 7) and the associated memory and/or processor to communicate, utilizing key information, the VPN data with the user device during the established VPN connection, as discussed elsewhere herein.

Process 500 may include additional aspects, such as any single aspect or any combination of aspects described below and/or in connection with one or more other processes described elsewhere herein.

In a first aspect, process 500 may include receiving the key information, including encryption information used to encrypt VPN data to be transmitted to the user device and decryption information used to decrypt VPN data to be received from the user device, from another VPN server from among the plurality of VPN servers.

In a second aspect, alone or in combination with the first aspect, process 500 includes receiving the key information, including encryption information used to encrypt VPN data to be transmitted to the user device and decryption information used to decrypt VPN data to be received from the user device, from the VSP control infrastructure.

In a third aspect, alone or in combination with the first through second aspects, process 500 includes communicating with the user device to determine the key information.

In a fourth aspect, alone or in combination with the first through third aspects, process 500 includes transmitting, to the VSP control infrastructure, an availability notification indicating an availability of the VPN server to securely communicate the VPN data with the user device.

In a fifth aspect, alone or in combination with the first through fourth aspects, process 500 includes transmitting, to another VPN server from among the plurality of VPN servers, the key information used by the VPN server to securely communicate the VPN data with the user device during the established VPN connection.

In a sixth aspect, alone or in combination with the first through fifth aspects, in process 500, the plurality of VPN servers is associated with a single entry internet protocol (IP) address.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with clustering of VPN servers in a VPN, according to various aspects of the present disclosure. In some aspects, the process 600 may be performed by one or more memory (e.g., memory 630) and/or one or more processor (e.g., processor 620) associated with one or more VPN servers (e.g., VPN servers 120). As shown by reference numeral 610, process 600 may include securely communicating, by a first VPN server from among the plurality of VPN servers, VPN data with a user device during an established VPN connection between the clustered network and the user device. For instance, a first VPN server may utilize the associated memory and/or processor to securely communicate VPN data with a user device during an established VPN connection between the clustered network and the user device, as discussed elsewhere herein.

As shown by reference numeral 620, process 600 may include receiving, by a second VPN server from among the plurality of servers, key information used by the first VPN server to securely communicate with the user device during the established VPN connection. For instance, a second VPN server may utilize a communication interface (e.g., communication interface 770 of FIG. 7) and the associated memory and/or processor to receive key information used by the first VPN server to securely communicate with the user device during the established VPN connection, as discussed elsewhere herein.

As shown by reference numeral 630, process 600 may include securely communicating, by the second VPN server, with the user device utilizing the key information during the established VPN connection. For instance, the second VPN server may utilize a communication interface (e.g., communication interface 670) and the associated memory and/or processor to securely communicate with the user device utilizing the key information during the established VPN connection, as discussed elsewhere herein.

Process 600 may include additional aspects, such as any single aspect or any combination of aspects described below and/or in connection with one or more other processes described elsewhere herein.

In a first aspect, in process 600, receiving the key information includes receiving encryption information used to encrypt VPN data to be transmitted to the user device and decryption information used to decrypt VPN data to be received from the user device.

In a second aspect, alone or in combination with the first aspect, in process 600, receiving the key information includes receiving the key information from the first VPN server.

In a third aspect, alone or in combination with the first through second aspects, in process 600, receiving the key information includes receiving the key information from a VPN service provider (VSP) control infrastructure.

In a fourth aspect, alone or in combination with the first through third aspects, in process 600, receiving the key information includes receiving the key information based at least in part on a determination that the first VPN server has become unavailable.

In a fifth aspect, alone or in combination with the first through fourth aspects, process 600 includes transmitting, by the first VPN server to a VPN service provider (VSP) control infrastructure, an availability notification indicating an availability of the first VPN server to securely communicate the VPN data with the user device.

In a sixth aspect, alone or in combination with the first through fifth aspects, in process 600, the first VPN server and the second VPN server are associated with a single entry internet protocol (IP) address associated with the clustered network.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700, according to various aspects of the present disclosure. In some aspects, the example devices 700 may form part of or implement the systems, servers, environments, infrastructures, components, devices, or the like described elsewhere herein (e.g., VSP control infrastructure, VPN server, etc.). The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. The term "computer-readable media" may refer to one or more non-transitory memory devices. A memory device or devices may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code-it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

receiving a VPN connection request from a user device;

associating two or more VPN servers with a single entry Internet Protocol (IP) address, wherein the two or more VPN servers includes a first VPN server and a second VPN server;

transmitting the single entry IP address to the user device;

establishing a secure VPN connection between the user device and the first VPN server using the single entry IP address;

transmitting, from the first VPN server to the second VPN server, key information associated with the secure VPN connection, wherein the key information comprises encryption related keys specific to the secure VPN connection between the user device and the first VPN server, the encryption related keys being used for encrypting and decrypting communications in the secure VPN connection; and switching the secure VPN connection to the second VPN server when the first VPN server becomes unavailable, wherein the secure VPN connection remains intact and the user device continues to communicate via the single entry IP address, and wherein the secure VPN connection remains intact by utilizing the key information received by the second VPN server without authenticating again or establishing new encryption keys when switching from the first VPN server to the second VPN server.

2. The method of claim 1, wherein the key information associated with the secure VPN connection comprises at least one of an encryption key or a decryption key.

3. The method of claim 1, further comprising:
selecting the first VPN server in response to determining that the first VPN server is an optimal server for the user device; and
selecting the second VPN server in response to determining that the second VPN server is a next optimal server after the first VPN server for the user device.

4. The method of claim 1, further comprising:
selecting the second VPN server based on factors including at least one of a location of the second VPN server relative to the user device or available bandwidth of the second VPN server.

5. The method of claim 1, further comprising:
determining that the first VPN server is unavailable in response to a failure to receive an availability notification from the first VPN server.

6. The method of claim 1, further comprising:
monitoring an availability of the first VPN server at configured intervals.

7. A system, comprising:
one or more processors, the one or more processors configured to execute instructions to:
receive a VPN connection request from a user device;
associate a first VPN server and a second VPN server with a single entry Internet Protocol (IP) address;
transmit the single entry IP address to the user device;
establish a secure VPN connection between the user device and the first VPN server using the single entry IP address;
transmit, from the first VPN server to the second VPN server, a key information associated with the secure VPN connection, wherein the key information comprises encryption related keys specific to the secure VPN connection between the user device and the first VPN server, the encryption related keys being used for encrypting and decrypting communications in the secure VPN connection; and
switch the secure VPN connection to the second VPN server when the first VPN server becomes unavailable, wherein the secure VPN connection remains intact and the user device continues to communicate via the single entry IP address, and
wherein the secure VPN connection remains intact by utilizing the key information received by the second VPN server without authenticating again or establishing new encryption keys when switching from the first VPN server to the second VPN server.

8. The system of claim 7, wherein the key information associated with the secure VPN connection comprises at least one of an encryption key or a decryption key.

9. The system of claim 7, wherein the one or more processors is further configured to:
select the first VPN server in response to determining that the first VPN server is an optimal server for the user device; and
select the second VPN server in response to determining that the second VPN server is a next optimal server after the first VPN server for the user device.

10. The system of claim 7, wherein the one or more processors is further configured to:
select the second VPN server based on factors including at least one of a location of the second VPN server relative to the user device or available bandwidth of the second VPN server.

11. The system of claim 7, wherein the one or more processors is further configured to:
determine that the first VPN server is unavailable in response to a failure to receive an availability notification from the first VPN server.

12. The system of claim 7, wherein the one or more processors is further configured to:
monitor an availability of the first VPN server at configured intervals.

13. Non-transitory computer readable media storing instructions operable to cause one or more processors to perform operations comprising:
receiving a VPN connection request from a user device;
associating a first VPN server and a second VPN server with a single entry Internet Protocol (IP) address;
transmitting the single entry IP address to the user device;
establishing a secure VPN connection between the user device and the first VPN server using the single entry IP address;
transmitting, from the first VPN server to the second VPN server, key information associated with the secure VPN connection, wherein the key information comprises encryption related keys specific to the secure VPN connection between the user device and the first VPN server, the encryption related keys being used for encrypting and decrypting communications in the secure VPN connection; and
switching the secure VPN connection to the second VPN server when the first VPN server becomes unavailable, wherein the secure VPN connection remains intact and the user device continues to communicate via the single entry IP address, and
wherein the secure VPN connection remains intact by utilizing the key information received by the second VPN server without authenticating again or establishing new encryption keys when switching from the first VPN server to the second VPN server.

14. The non-transitory computer readable media of claim 13, wherein the key information associated with the secure VPN connection comprises at least one of an encryption key or a decryption key.

15. The non-transitory computer readable media of claim 13, wherein the operations further comprise: selecting the first VPN server in response to determining that the first VPN server is an optimal server for the user device; and selecting the second VPN server in response to determining that the second VPN server is a next optimal server after the first VPN server for the user device.

16. The non-transitory computer readable media of claim 13, wherein the operations further comprise: selecting the second VPN server based on factors including at least one of geographic proximity a location of the second VPN server relative to the user device or available bandwidth of the second VPN server.

17. The non-transitory computer readable media of claim 13, wherein the operations further comprise: determining that the first VPN server is unavailable in response to a failure to receive an availability notification from the first VPN server.

\* \* \* \* \*